Dec. 17, 1968     J. A. DALLEN     3,416,279
RESILIENT CORNER GASKET
Filed Dec. 23, 1966
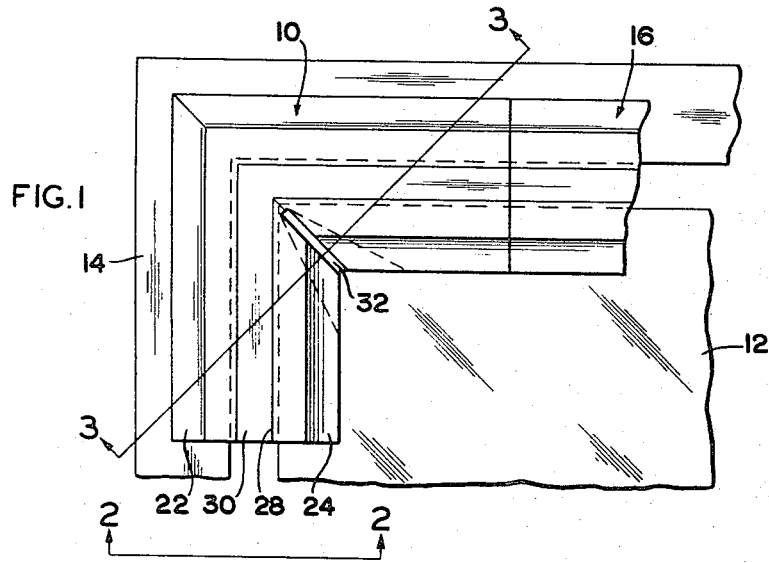
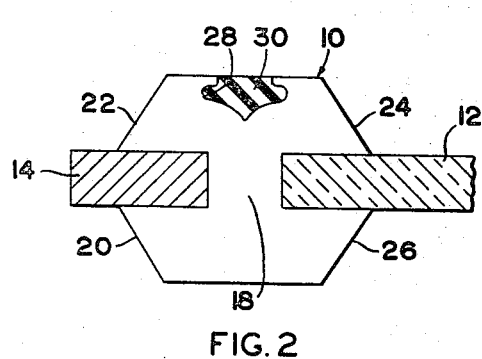
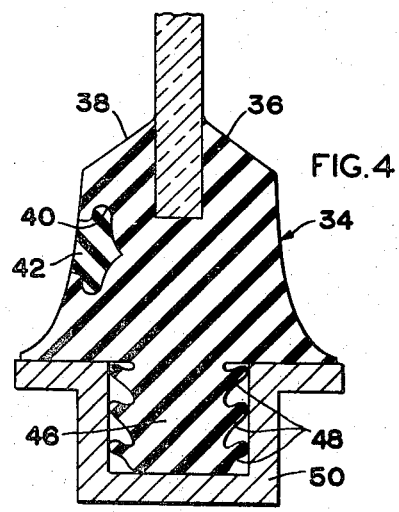
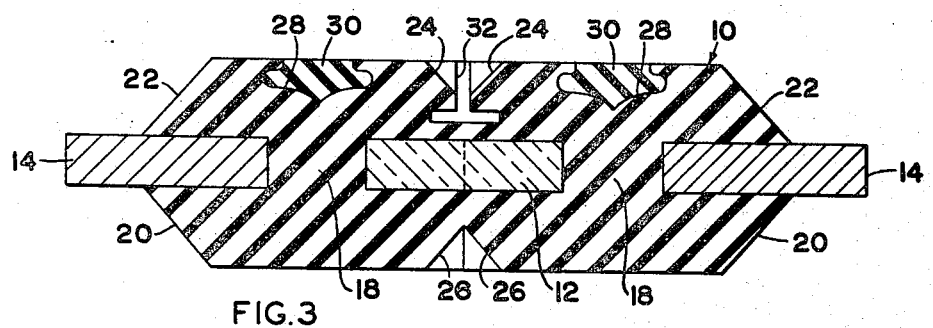
INVENTOR.
JOHN A. DALLEN
BY
Meyer, Tilberry & Body
ATTORNEYS.

3,416,279
RESILIENT CORNER GASKET
John A. Dallen, Port Clinton, Ohio, assignor to The Standard Products Company, Cleveland, Ohio, a corporation of Ohio
Filed Dec. 23, 1966, Ser. No. 604,404
2 Claims. (Cl. 52—400)

ABSTRACT OF THE DISCLOSURE

A resilient corner gasket having an apex formed by complementary membranous wings extending inwardly from a base portions to a leading edge, an included cavity within the bodies of a complementary pair of wings localized at the apex, and comprising a slot disposed in a plane generally parallel to the wings and extending substantially from the base portions to the leading edges of the wings.

---

This invention relates to the gasket art and more particularly to a resilient corner gasket.

The present invention is particularly applicable to resilient corner gaskets adapted to be interposed between the corner portions of sheet glass and a frame, and it will be described with particular reference thereto; however, it will be appreciated that the invention has broader applications and may be used in various other gasketing arrangements.

Resilient gaskets, formed from elastomeric materials such as neoprene are widely used for mounting, sealing and cushioning panels, such as sheet glass, in a wall of a building or in automobile bodies. In general, straight lengths of a gasket material are extruded, while corner gaskets are molded, and then the straight lengths and corner pieces are vulcanized, adhesively secured, or otherwise joined together to form a peripheral gasket.

One commonly used form of gasket comprises a pair of generally parallel, spaced wings, operative to receive the edge and corner portions of a sheet of glass. On the opposite side of the gasket from these wings is some form of anchoring means adapted to receive or be received by a frame or wall member.

In order to facilitate the reception of the edge and corner portions of a glass sheet between the gasket wings, it is necessary to lay back one of the wings to expose the space therebetween. In case of straight lengths of gasket, this can be accomplished by providing an external, longitudinally extending groove at or near the base of the one wing to be laid back. After the glass edge is in position, the groove is filled with a locking strip which urges the adjacent wing into sealing engagement with the glass sheet.

The groove and locking strip arrangement does not work well with corner gaskets, so that the insertion of glass sheet corners, by laying back the apex portion of the corner gasket formed by the convergence of angularly displaced pairs of wings, remains a problem.

The present invention is addressed to a gasket corner of improved design which facilitates the insertion of glass sheet corners.

In accordance with the present invention, there is provided, in a resilient corner gasket, having an apex portion formed by the convergence of angularly displaced pairs of generally parallel, spaced membranous wings, operative to receive an outside corner of a panel for sealing engagement therebetween; means facilitating the reception of said panel corner comprising, in at least one of said wings, a reduced cross-sectional area of membranous material, localized in the vicinity of said apex portion.

It is, therefore, an object of the present invention to provide a resilient corner gasket of improved design.

A further object of the invention is to provide a resilient corner gasket having means facilitating the reception of the corner of a panel for sealing engagement therewith.

These and other objects and advantages will become apparent from the following detailed description of a preferred embodiment of the invention when read in connection with the accompanying drawings, in which:

FIGURE 1 is a fragmentary schematic plan view showing a preferred embodiment of the invention;

FIGURE 2 is a schematic section view taken generally along lines 2—2 of FIGURE 1;

FIGURE 3 is a schematic section view taken generally along lines 3—3 of FIGURE 1; and FIGURE 4 is a schematic section view of a modification of a gasket shown in FIGURE 2.

Referring now to the drawings, wherein the showings are for purposes of illustrating preferred embodiments of the invention only, and not for the purpose of limiting the same, FIGURE 1 shows a resilient corner gasket 10 interposed between a sheet of glass 12 and a frame 14. Resilient corner gasket 10 together with straight lengths of gasket 16 form a peripheral seal for glass sheet 12 with respect to frame 14.

As best seen in FIGURE 2, the gasket comprises a cross web 18, a pair of wings 20 and 22 adapted to receive and sealingly engage frame 14, and an opposed pair of wings 24 and 26 adapted to receive and sealingly engage glass sheet 12. The gasket may further comprise an external longitudinally extending groove 28 at or near the base of wings 22 and 24. As described above, the position of this groove in straight lengths of gasket facilitates the laying back of wings 22 and 24, simplifying the insertion of the edge portions of frame 14 and glass sheet 12, respectively. After these insertions have been made, groove 28 is filled with locking strip 30 which urges wings 22 and 24 into sealing engagement with frame 14 and glass sheet 12, respectively.

Since the groove and locking strip arrangement does not facilitate the insertion of the corners of glass sheet 12, resilient corner gasket 10 is provided with separate means facilitating the reception of a corner of glass plate 12. Such means are provided at the apex portion formed by the convergence of angularly displaced pairs of wings, and comprises a reduced cross-sectional area of membranous material, localized in the vicinity of the apex portion.

As shown in FIGURES 1 and 3, the reduced cross-sectional area of membranous material is provided by the inclusion of a cavity 32. The cavity in the preferred embodiment shown in the drawings, is T-shaped in cross section with the crosspiece of the T running generally parallel to the plane of wing 24. Further, the crosspiece of the T is widest at the leading edge of wing 24 and tapers in width as it moves toward the base of the wing. The stem portion of the T extends from the crosspiece upward generally perpendicular to the plane wing 24 and terminates in a narrow slot in the upper surface of wing 24. This slotted opening is necessary where the resilient corner gasket is formed by molding.

With the presence of an included cavity at the apex portion of resilient corner gasket 10 formed by the convergence of angularly displaced pairs of wings 24 and 26, the force required to overcome the elasticity of wing 24 is greatly reduced, thus, facilitating the insertion of the corner of glass sheet 12.

The improved resilient corner gasket of the present invention may take cross-sectional configurations other than that shown in FIGURE 2. For instance, the corner gasket may take the configuration shown in FIGURE 4. Here resilient corner gasket 34 is provided with a pair of glass sheet engaging wings 36 and 38, a groove 40, a locking strip 42, and a frame anchor 46 having a plurality of ribs 48 adapted to forcibly engage channel frame 50. It will be understood that in accordance with the present invention, wing 38 is provided with an included cavity facilitating its being laid back to permit the insertion of the corner of the glass sheet between wings 36 and 38.

The present invention has been described in conjunction with certain structural embodiments; however, it is to be appreciated that various structural changes may be made in the illustrated embodiments without departing from the intended scope and spirit of the present invention as defined in the appended claims.

Having thus described my invention, I claim:

1. In a resilient corner gasket, having an apex portion formed by the convergence of angularly displaced, complementary pairs of generally parallel, spaced membranous wings extending inwardly of said gasket from a base portion to a leading edge, and operative to receive an outside corner of a panel for sealing engagement therebetween; means facilitating the reception of said panel corner comprising an included cavity within the bodies of at least one of said complementary pairs of wings, comprising a slot disposed in a plane generally parallel to said wings and extending substantially from the base portions to the leading edges thereof, thereby providing a reduced cross-sectional area of membranous wings localized in the vicinity of said apex portion, to facilitate the laying back of the wings for insertion of the corner of said panel.

2. The resilient corner gasket as defined in claim 1 wherein said included cavity is in the form of a generally T-shaped slot.

References Cited
UNITED STATES PATENTS

| | | | |
|---|---|---|---|
| 2,637,880 | 5/1953 | Beck | 52—208 |
| 2,764,786 | 10/1956 | Flemming | 52—208 |
| 2,878,535 | 3/1959 | Bush | 52—208 XR |
| 3,009,216 | 11/1961 | Kimber | 52—403 XR |
| 3,279,124 | 10/1966 | Brown | 49—479 |

KENNETH DOWNEY, *Primary Examiner.*

U.S. Cl. X.R.

49—482